United States Patent
Lammers

(12) United States Patent (10) Patent No.: US 7,090,237 B1
Lammers (45) Date of Patent: Aug. 15, 2006

(54) APPARATUS FOR PULLING A TRAILER BEHIND A BOAT TRAILER

(76) Inventor: Tracy L. Lammers, 4304 S. Plains Dr., Sioux Falls, SD (US) 57106

( * ) Notice: Subject to any disclaimer, the term of this patent is extended or adjusted under 35 U.S.C. 154(b) by 0 days.

(21) Appl. No.: 10/899,506

(22) Filed: Jul. 26, 2004

(51) Int. Cl.
*B60P 3/10* (2006.01)
*B60P 3/00* (2006.01)

(52) U.S. Cl. .................. 280/414.1; 280/411.1
(58) Field of Classification Search ............. 280/411.1, 280/414.1
See application file for complete search history.

(56) References Cited

U.S. PATENT DOCUMENTS

| | | | |
|---|---|---|---|
| 2,776,761 A * | 1/1957 | Lovelace | 280/414.1 |
| 2,926,930 A * | 3/1960 | Pease | 280/475 |
| 3,056,517 A * | 10/1962 | Trumbull | 414/532 |
| 3,342,508 A * | 9/1967 | Thomas | 280/414.1 |
| 3,554,394 A * | 1/1971 | Hedman | 414/350 |
| 3,945,521 A * | 3/1976 | Decker | 414/483 |
| 4,103,926 A * | 8/1978 | Johnston et al. | 280/414.1 |
| 4,252,373 A | 2/1981 | Briggs | |
| 4,280,712 A * | 7/1981 | Clark | 280/144 |
| 4,333,665 A | 6/1982 | Haddock | |
| 4,397,594 A | 8/1983 | Hammonds et al. | |
| 4,875,527 A | 10/1989 | Foley et al. | |
| 5,026,229 A | 6/1991 | Matyas et al. | |
| 5,054,804 A | 10/1991 | Stewart | |
| 5,626,356 A | 5/1997 | Harwood | |
| 5,949,329 A * | 9/1999 | Woodard | 340/431 |

* cited by examiner

*Primary Examiner*—Lesley D. Morris
*Assistant Examiner*—Marlon Arce-Diaz
(74) *Attorney, Agent, or Firm*—Jeffrey A. Proehl; Woods Fuller Shultz & Smith PC

(57) ABSTRACT

An apparatus for pulling a trailer behind a trailer is disclosed, and includes a mounting bracket assembly for mounting on the rear of the trailer, and a main trailing member mounted on the mounting bracket assembly in a manner such that the main trailing member is swingable about a substantially vertical axis for permitting movement of the trailing member in a transverse direction with respect to a longitudinal axis of the trailer. The main trailing member may be mounted on the mounting bracket assembly in a manner such that the trailing member is pivotable about a substantially horizontal axis for permitting movement of the main trailing member in a substantially vertical direction. The apparatus may include at least one support configured for connecting to a boat carried on the trailer to provide support to the main trailing member from the boat.

22 Claims, 9 Drawing Sheets

APPARATUS FOR PULLING A TRAILER BEHIND A BOAT TRAILER

BACKGROUND OF THE INVENTION

1. Field of the Invention

The present invention relates to trailer modifications and more particularly pertains to apparatus that permit a second trailer to be pulled behind a first trailer in a tandem configuration.

2. Description of the Prior Art

As people acquire more and more motorized recreational vehicles, it becomes more and more difficult to transport all of these recreational vehicles to a desired location to use them. This is especially true with recreational vehicles used in water sports, such as motor boats and personal watercraft. The use of both a boat and a personal watercraft by the same group of users is becoming more common, and this has often required the use of multiple vehicles so that a vehicle is available to tow each of the boat and personal watercraft.

The use of apparatus to modify a first trailer to be able to pull a second trailer behind the first trailer are generally known, and the apparatus illustrated in U.S. Pat. No. 4,333,665 to Haddock is an illustration of one such device. While the apparatus illustrated in the patent to Haddock is functional for its intended purpose, it is believed that the Haddock apparatus does have some significant limitations. First, and probably foremost, the apparatus must be removed from the trailer to permit a boat to be loaded onto the trailer and also to permit the boat to be removed from the trailer, and then must be reattached thereafter to permit use of the apparatus for its purpose. Since the Haddock apparatus is relatively bulky, the removal and replacement of the apparatus at each boat loading and unloading can be difficult as well as time consuming. Secondly, the positioning of the hitch ball with respect to the trailer is relatively fixed in the Haddock apparatus, and thus the height of the hitch ball above the ground surface is thus dependent upon the position and orientation of the trailer. Thus, the Haddock apparatus must extend about the propeller and lower drive unit of the motor of the boat.

Thus, while the Haddock apparatus of the U.S. Pat. No. 4,333,665 is certainly functional and useful for its intended purpose, it is believed that the elimination of some of these functional and structural drawbacks would produce a more easily and conveniently used apparatus for pulling a second trailer behind a first trailer.

SUMMARY OF THE INVENTION

In view of the foregoing disadvantages inherent in the known types of trailer modifications now present in the prior art, the present invention provides a new apparatus for pulling a trailer behind a boat trailer that is easily used and easily adjusted and does not have to be removed from the trailer to remove the boat from the trailer.

To attain this, the present invention generally comprises an apparatus for pulling a trailer behind a boat trailer, and includes a mounting bracket assembly for mounting on the rear of the trailer. The apparatus of the invention also includes a main trailing member that is mounted on and extends from the mounting bracket assembly. The main trailing member is mounted on the mounting bracket assembly in a manner such that the main trailing member is swingable about a substantially vertical axis for permitting movement of at least a portion of the main trailing member in a transverse direction with respect to a longitudinal axis of the trailer.

In one highly preferred embodiment of the invention, the main trailing member is also mounted on the mounting bracket assembly in a manner such that the main trailing member is pivotable about a substantially horizontal axis for permitting movement of at least a portion of the main trailing member in a substantially vertical direction.

In some embodiments of the invention, the apparatus includes at least one support that is configured to be connectable to a boat carried on the trailer to provide support to the main trailing member from the boat, and a rearward end of the support may be pivotally mounted on the main trailing member while the forward end is configured to removably attach to a structure on the boat on the trailer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the ability to pivot the main trailing member of the apparatus of the invention laterally when it is desired to load a boat onto the trailer, or remove the boat from the trailer, without having to remove the main trailing member from the trailer to accomplish these operations. The invention also permits adjustability in the height of the hitch mount of the apparatus, so that the user can set the apparatus to a desirable height so that the tongue of the second trailer is suitably oriented for safe pulling.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
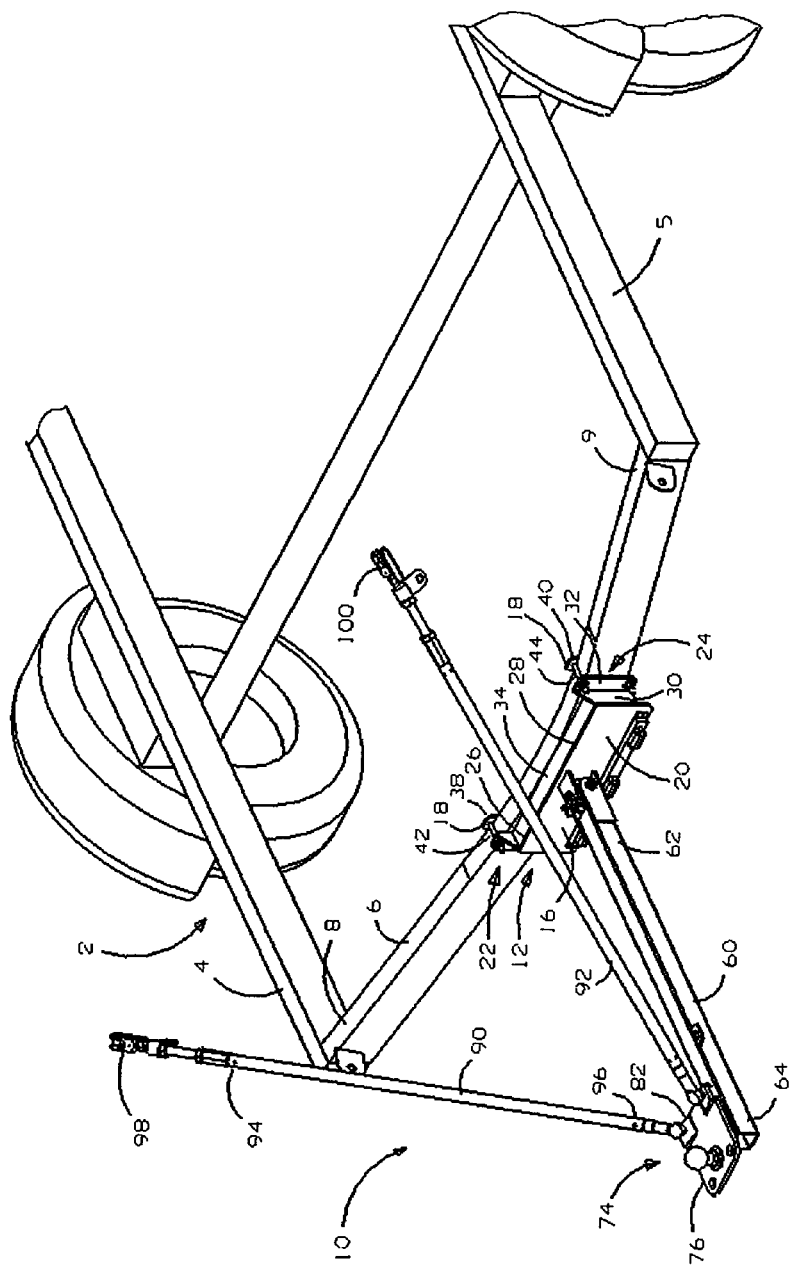
FIG. 1 is a schematic perspective view of the present invention mounted on a broken away rear portion of a trailer.
Figure 2:
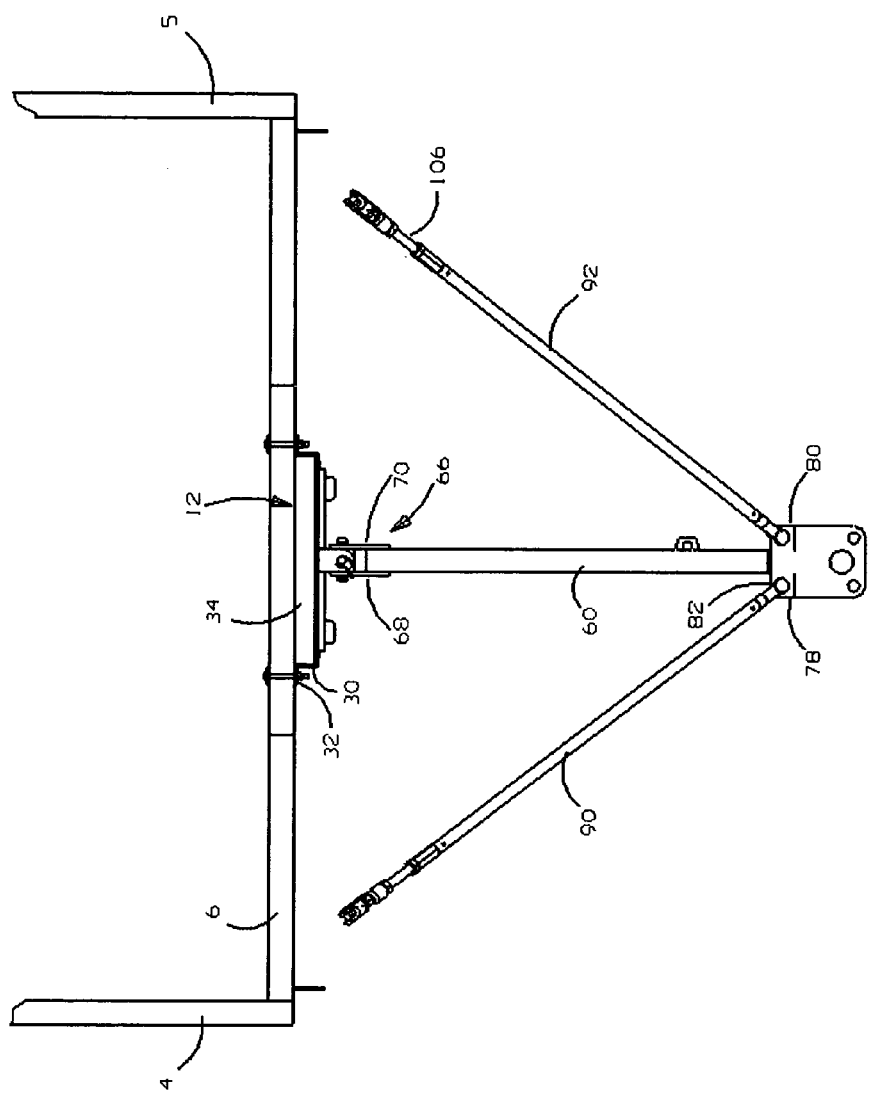
FIG. 2 is a schematic top view of the present invention mounted on the rear portion of the trailer.
Figure 3:
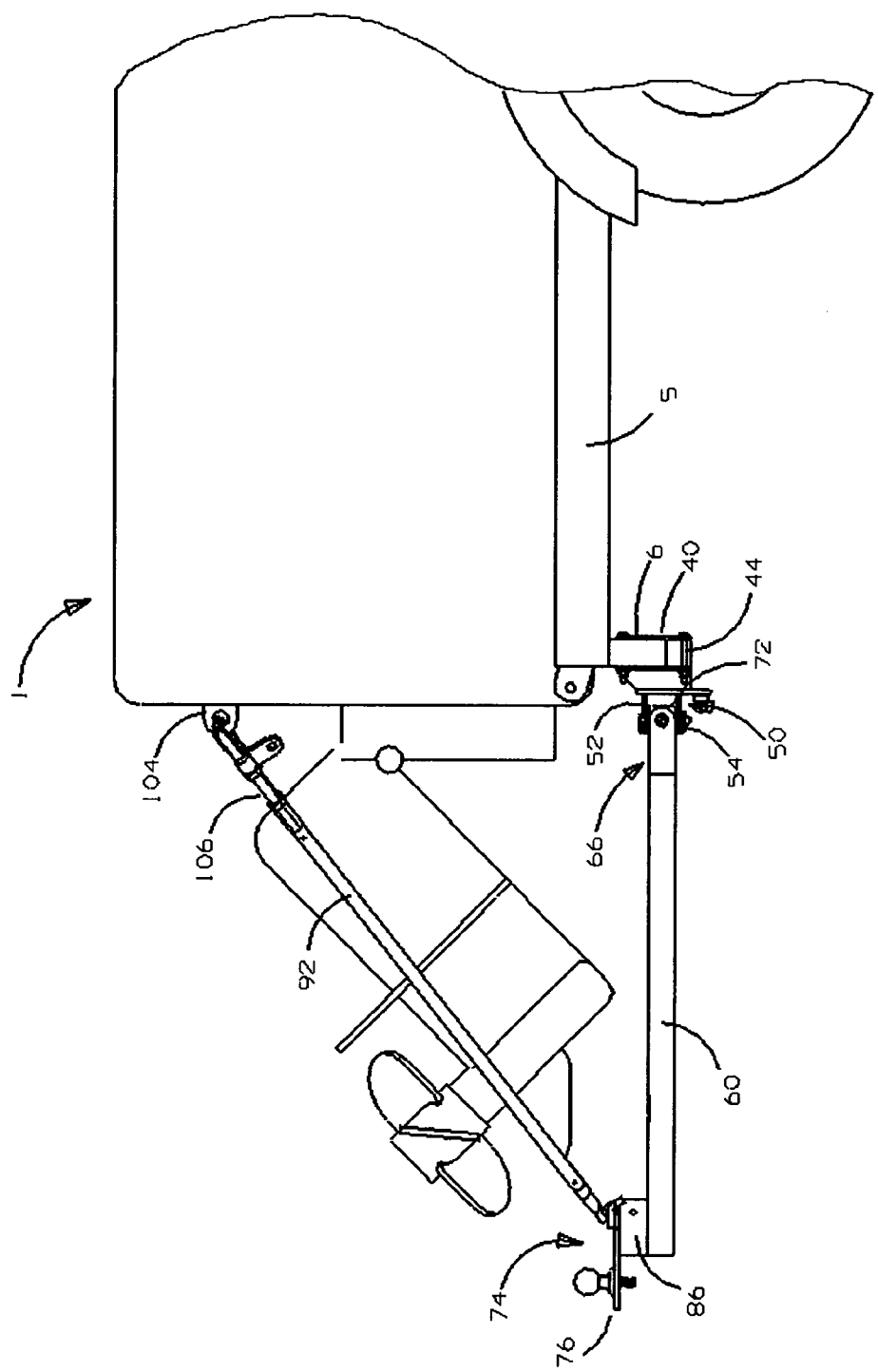
FIG. 3 is a schematic right side view of the present invention on the rear of the trailer.
Figure 4:
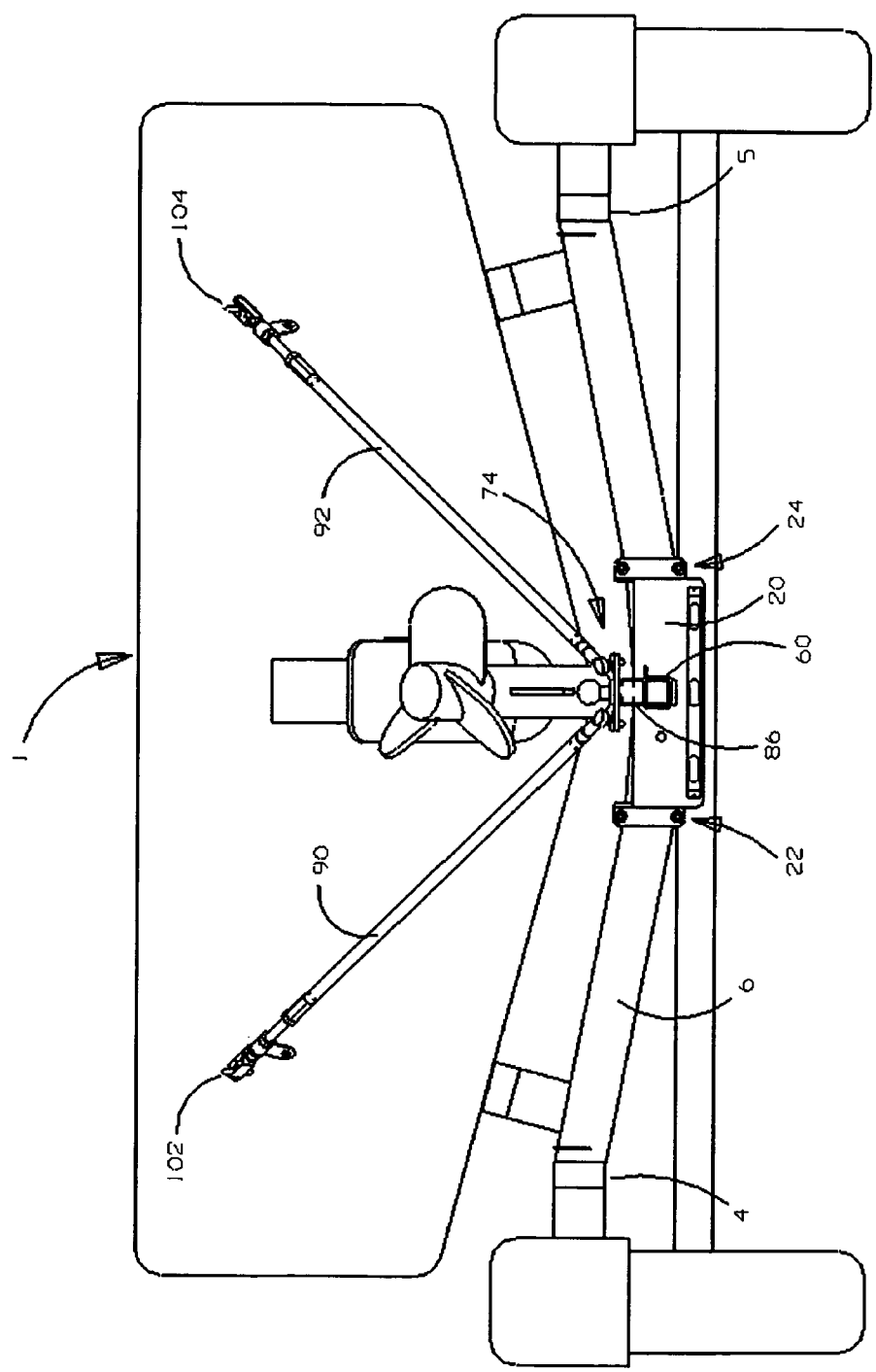
FIG. 4 is a schematic rear view of the present invention on the rear of the trailer.
Figure 5:
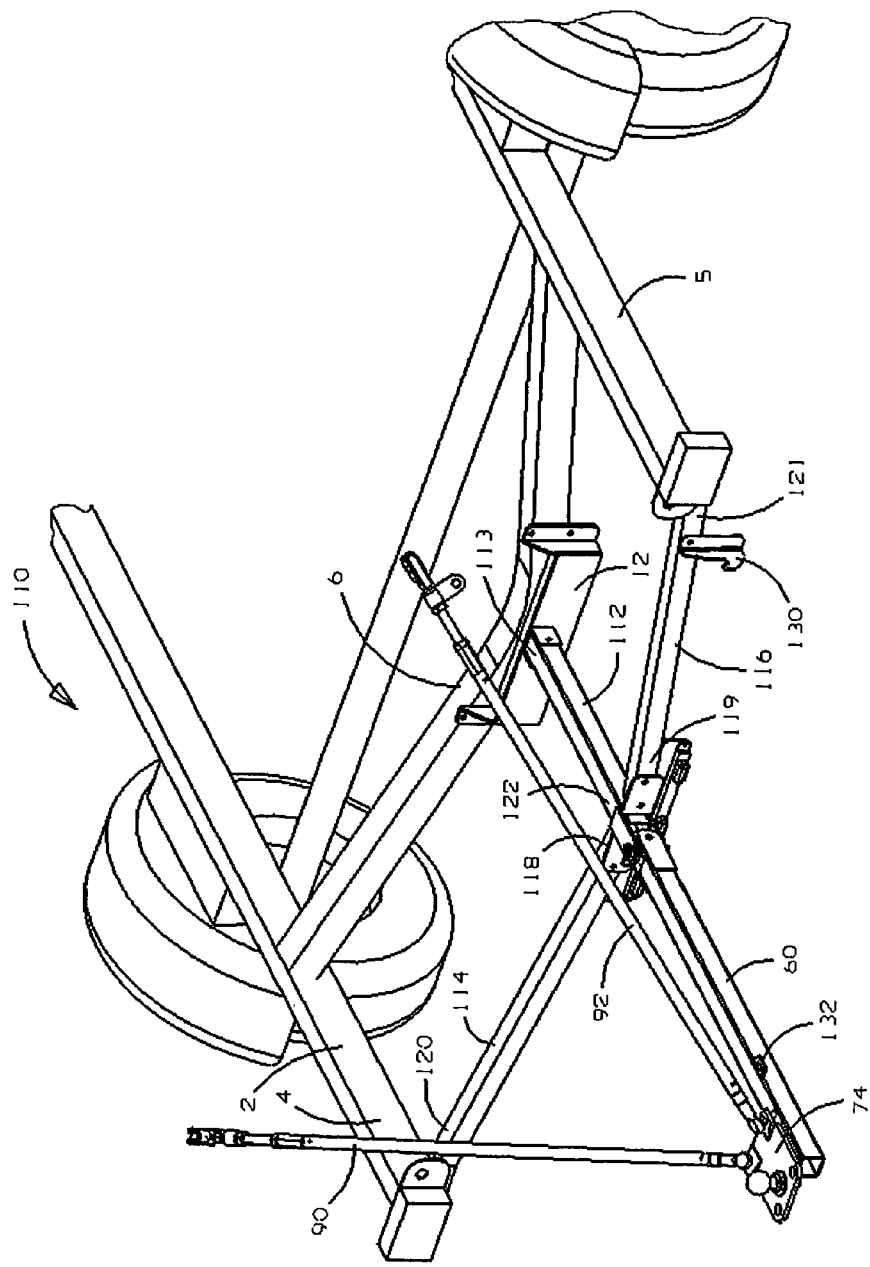
FIG. 5 is a schematic perspective view of the present invention with optional features suitable for use with trailers in which the rearmost transverse cross member is spaced forward of the rear of the trailer.
Figure 6:
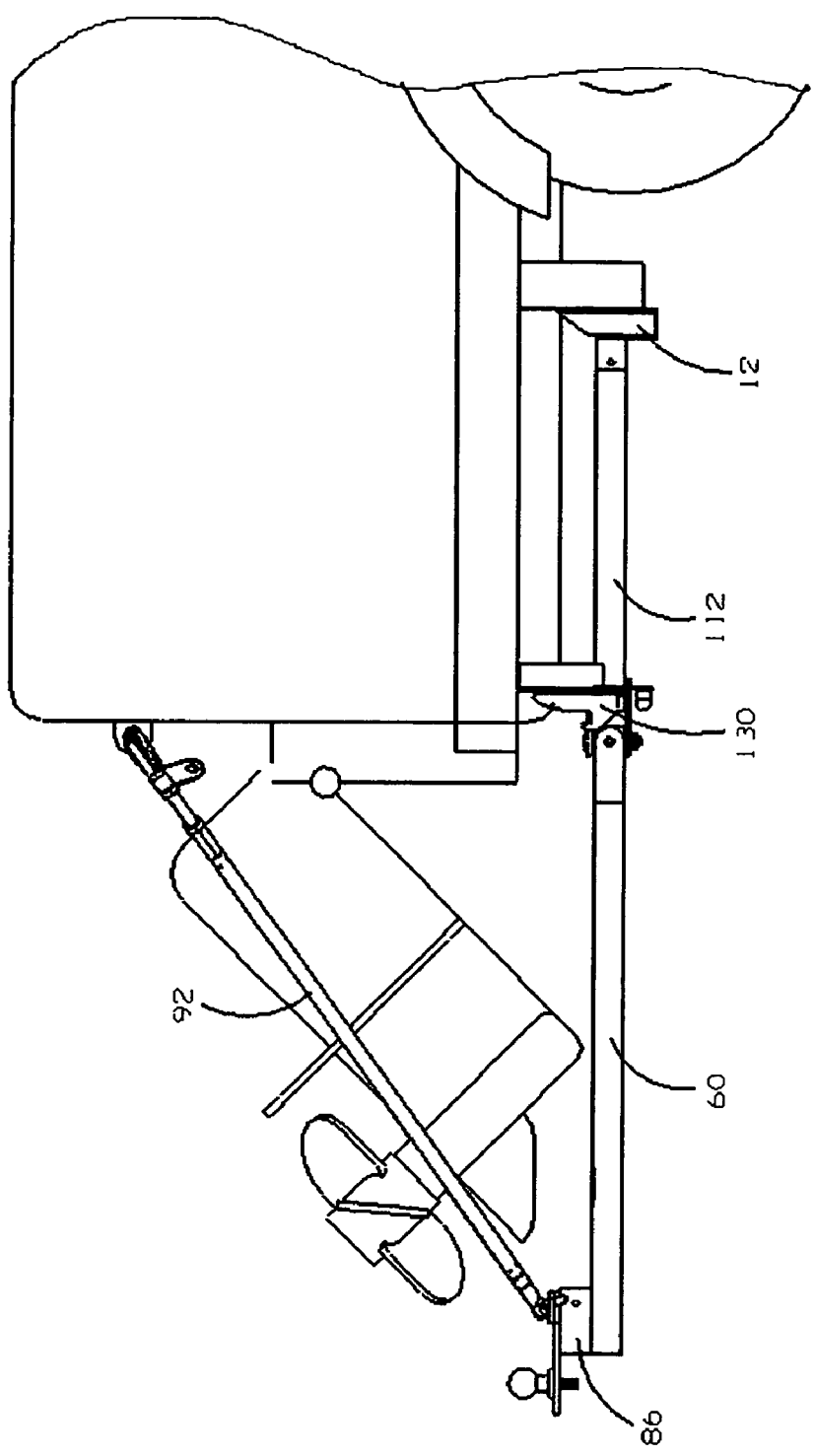
FIG. 6 is a schematic side view of the implementation of the present invention depicted in FIG. 5.
Figure 7:
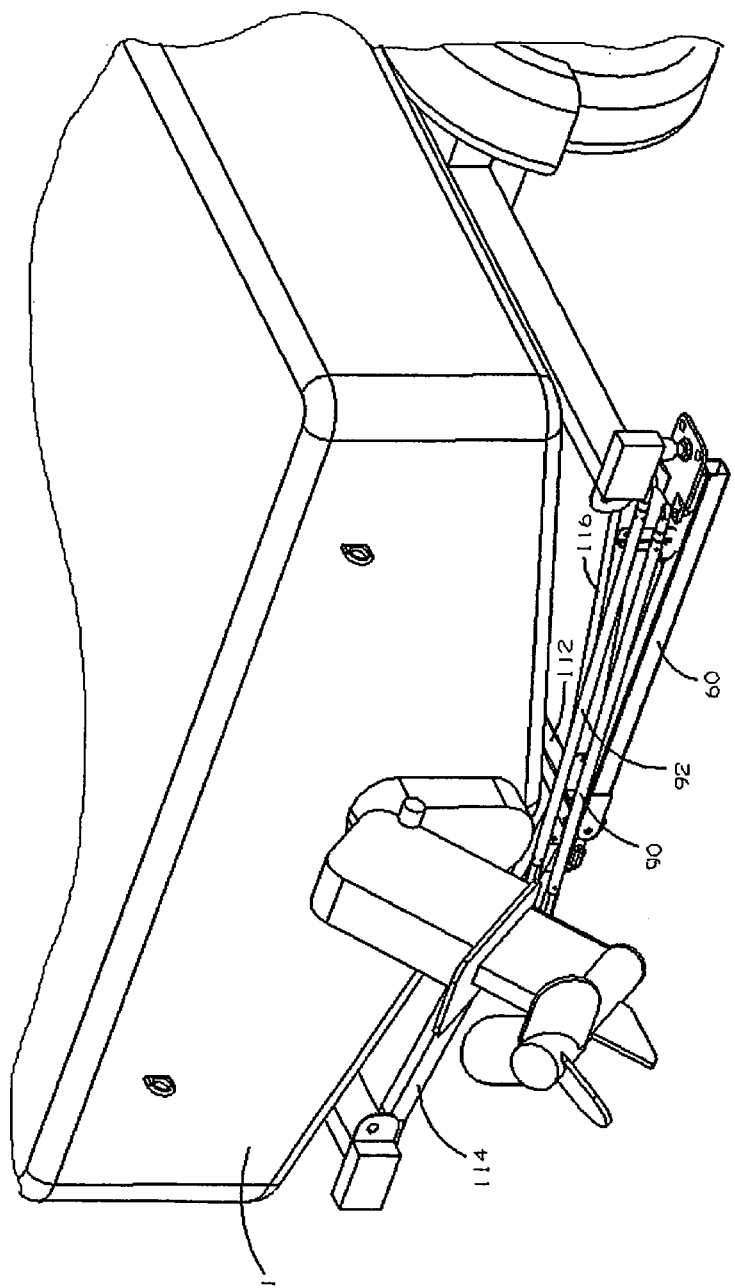
FIG. 7 is a schematic perspective view of the present invention depicted in FIG. 5 in a folded or stowed position suitable for when a second trailer is not being towed behind the first trailer.
Figure 8:
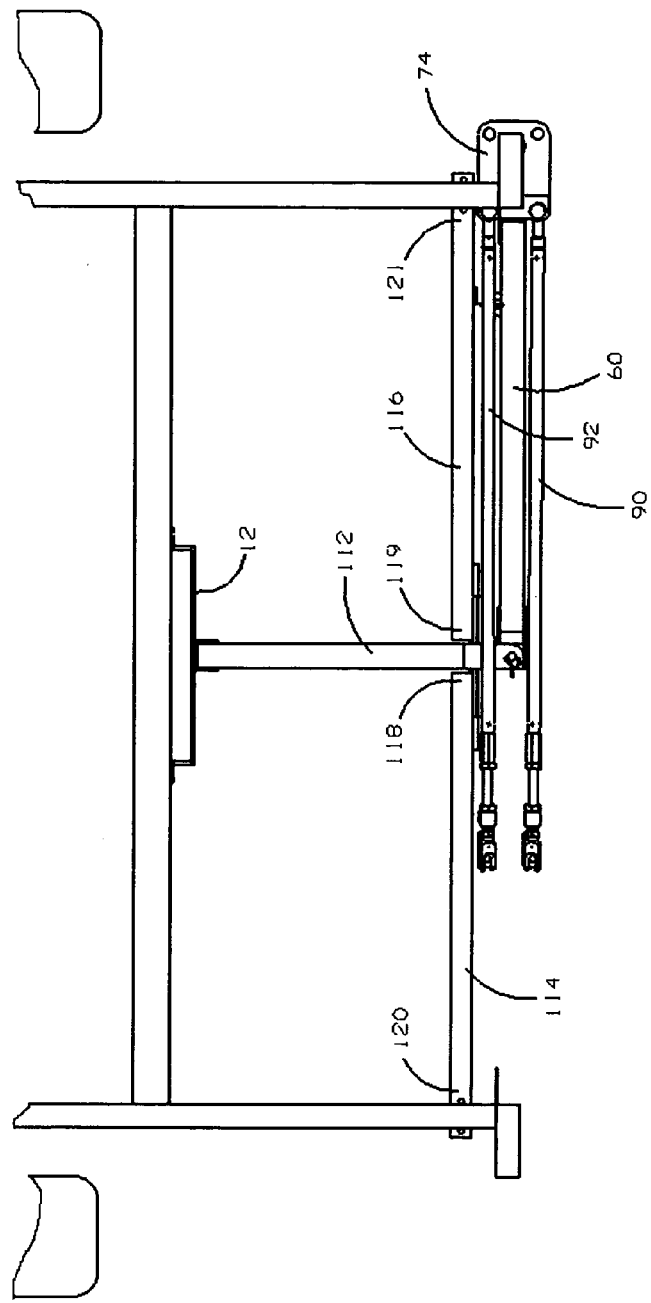
FIG. 8 is a schematic top view of the present invention depicted in FIG. 5 in the stowed position.
Figure 9:
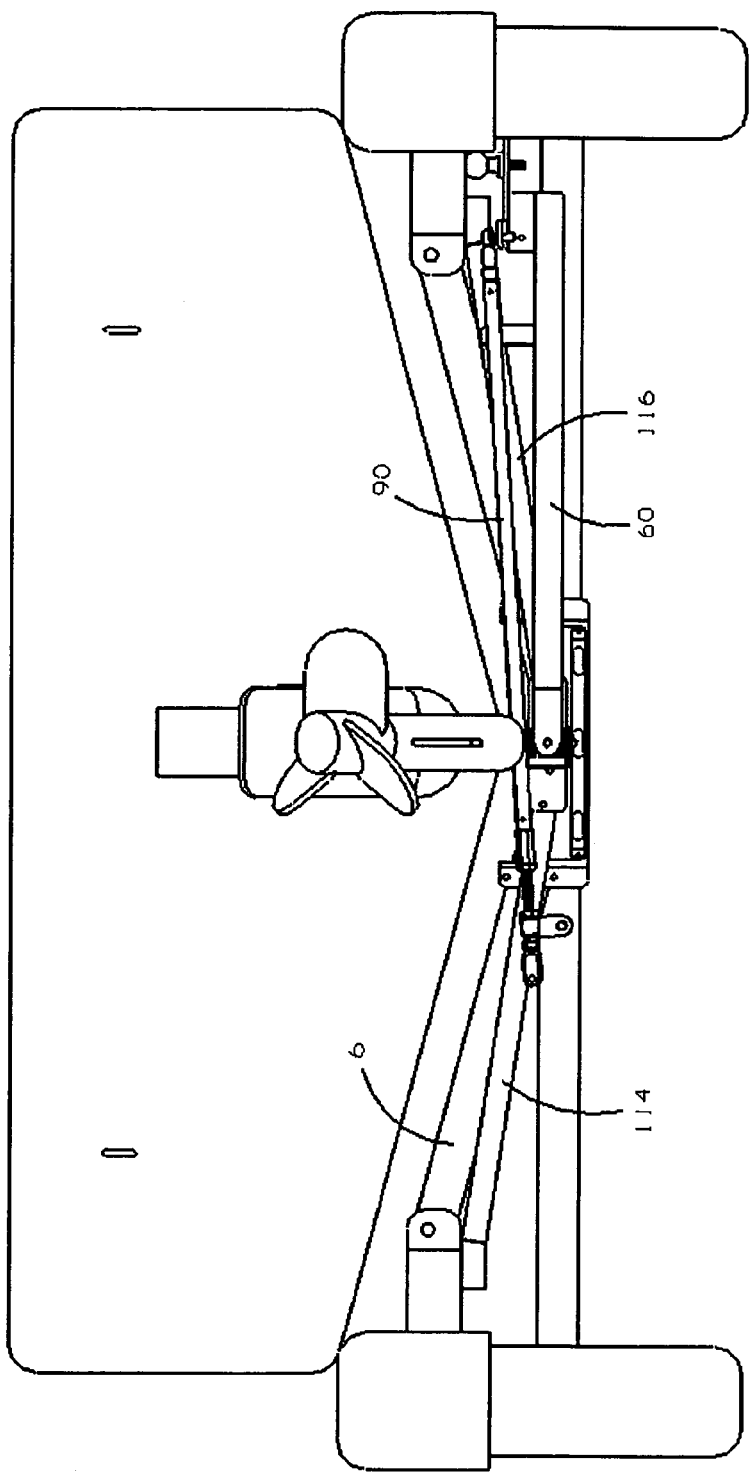
FIG. 9 is a schematic rear view of the present invention depicted in FIG. 5 in a folded position.

With reference now to the drawings, and in particular to FIGS. 1 through 9 thereof, a new apparatus embodying the principles and concepts of the present invention and generally designated by the reference numeral 10 will be described.

As best illustrated in FIGS. 1 through 4, the apparatus 10 for pulling a trailer behind a boat trailer generally comprises a mounting bracket assembly 12 for mounting on the rear of a trailer 2, a main trailing member 60 for supporting a hitch ball, and a pair of supports 90, 92 for providing support to the main trailing member 60.

In greater detail, the apparatus 10 for pulling a trailer behind a boat trailer is highly suitable for a trailer 2 having a pair of longitudinal frame members 4, 5, and at least one transverse cross member 6 that extends between the longitudinal frame members 4, 5. The transverse cross member 6 may have opposite portions 8, 9 that are each joined to one of the longitudinal frame members 4, 5.

The mounting bracket assembly 12 of the apparatus 10 of the invention is mountable on the transverse cross member 6 of the trailer 2 in a substantially central location between the opposite portions 8, 9 of the cross member 6 which are mounted on the longitudinal frame members 4, 5. The mounting bracket assembly 12 is configured to clamp onto a portion of the transverse cross member 6 of the trailer 2. In at least one embodiment of the invention, the mounting bracket assembly 12 is removably mountable on the cross member 6 of the trailer 2, so that the apparatus 10 of the invention may be removed and replaced as needed on the trailer, although more permanent mountings may be employed.

In the illustrative embodiment of the invention, the mounting bracket assembly 12 includes a primary portion 16 and a secondary portion 18 for clamping the cross member 6 therebetween. The primary portion 16 is positionable alongside the transverse cross member 6, such as a substantially central portion of the cross member 6. In one illustrative embodiment of the invention, the primary portion 16 includes a transverse plate member 20 and a pair of end assemblies 22, 24. Each of the end assemblies 22, 24 may be mounted on opposite end portions 26, 28 of the transverse plate member 20. Each of the end assemblies 22, 24 may generally extend substantially perpendicular to the transverse plate member 20. Each of the end assemblies 22, 24 comprises an end plate 30 that is oriented substantially perpendicular to the transverse plate member 20 and a bolt plate 32 that extends substantially parallel to the transverse plate member 20. The bolt plate 32 of each of the end assemblies 22, 24 is positionable against the transverse cross member 6 of the trailer 2. The primary portion 16 may further include one or more ribs 34 that are mounted on, and extend along a longitudinal axis of, the transverse plate member 20.

The secondary portion 18 of the mounting bracket assembly 12 for positioning alongside the transverse cross member 6 on a substantially opposite side of the transverse cross member 6 from the primary portion 16 in a manner permitting the portion of the transverse cross member 6 to be clamped between the primary 16 and secondary 18 portions of the mounting bracket assembly 12. The secondary portion 18 of the assembly 12 may include at least two clamping members 38, 40, and a pair of fasteners 42, 44 that extend between each of the clamping members 38, 40 and the primary portion 16 such that tightening of the fasteners 42, 44 pulls the clamping members 38, 40 toward the primary portion 16 to thereby clamp or pinch the cross member 6 therebetween.

Although the aforedescribed structure of the mounting bracket assembly 12 is highly preferred, other structural arrangements may be employed and remain within the spirit of the invention, including but not limited to direct mounting of the primary portion 16 to the transverse cross member 6 or employing a U-shaped bolt to secure the primary portion 16 to the cross member 6.

The mounting bracket assembly 12 may also include a first pivot joint portion 50 that is mounted on the primary portion 16 of the assembly 12. The first pivot joint portion 50 may include a pair of spaced ears 52, 54 that extend from the primary portion 16, and may be employed to mount the main trailing member 60 on the mounting bracket assembly 12 as described below.

The main trailing member 60 is mounted on and is extended from the mounting bracket assembly 12. The main trailing member 60 is preferably mounted on the mounting bracket assembly 12 in a manner such that the main trailing member is swingable about a substantially vertical axis for permitting movement of at least a portion of the main trailing member in a transverse direction with respect to a longitudinal axis of the trailer 2. Further, the main trailing member 60 is mounted on the mounting bracket assembly 12 in a manner such that the main trailing member 60 is pivotable about a substantially horizontal axis for permitting movement of at least a portion of the main trailing member 60 in a substantially vertical direction.

In greater detail, the main trailing member 60 has an inboard end 62 that is mounted on the bracket member assembly 12 and an outboard end 64 that is capable of having a hitch ball mounted thereon. A second pivot joint portion 66 may be mounted on the inboard end 62 of the main trailing member 60, and may comprise a pair of ears 68, 70 that extend from the inboard end 62. A pivot joint element, or spider, 72 may be mounted between the first pivot joint portion 50 on the mounting bracket assembly 12 and the second pivot joint portion 66 on the main trailing member 60.

A hitch mount 74 may be mounted on the outboard end 64 of the main trailing member 60, and may comprise a mounting plate 76 that extends along an outboard portion of the main trailing member 60. In at least one embodiment of the invention, the hitch mount 74 includes a pair of support mounts 78, 80 that may be located on opposite lateral sides of the main trailing member 60. Each of the support mounts 78, 80 may comprise a mounting tab 82. Each of the mounting tabs 82 may include an aperture that extends through the mounting tab. In some embodiments, each of the mounting tabs 82 extends in a plane that is angled upwardly and outwardly from a plane of the mounting plate 76.

Optionally, the hitch mount 74 may also include a receiver tube 86 for receiving a hitch assembly of a receiver hitch, which typically comprises a hitch ball mounted on an elongate member that is partially insertable into an interior cavity into the receiver tube 86. The interior cavity of the receiver tube 86 may extend substantially parallel to a longitudinal axis of the main trailing member 60. The receiver tube 86 may be positioned below the mounting plate 76, and the receiver tube 86 may be positioned above the main trailing arm 60.

The supports 90, 92 of the invention may be connectable to a boat 1 carried on the trailer 2 for providing support to the main trailing member 60 from the boat. Although the invention is described in terms of a pair of supports 90, 92, it will be realized by those skilled in the art that a single support may be employed, but the use of a pair of supports is highly preferred for resisting lateral forces applied to the main trailing member 60. The supports 90, 92 each have a forward end 94 and a rearward end 96. The rearward end 96 of the supports 90, 92 may be mounted on the outboard end 64 of the trailing member 60. The rearward end 96 may be pivotally mounted on the support mounts 78, 80 of the hitch mount 74 of the main trailing member 60, and may be mounted with a swivelable mount to permit pivoting about more than one axis.

The forward end 94 of the support 90, 92 may be configured for mounting to the boat on the trailer 2. The supports 90, 92 may each comprise a connecting structure 98, 100 for connecting the support 90, 92 to an eye 102, 103 mounted on the transom 104 of the boat. The connecting structure 98, 100 may be located toward the forward ends 94 of the supports 90, 92. The connecting structure 98, 100 is preferably removably connectable to the eye 102, 103 on the boat. In the illustrative embodiment of the invention, each of the connecting structures 98, 100 comprises a clevis assembly mounted on the forward end 94 of the supports 90, 92.

When the invention is installed on a trailer 2 with a boat being positioned on the trailer, the pair of supports 90, 92 are located on opposite lateral sides of the main trailing member 60, and the supports converge toward the outboard end 64 of the main trailing member and diverging toward the inboard end 62 of the main trailing member;

The supports 90, 92 of the invention may also include adjusting structure 106 for adjusting a length of the respective support 90, 92. In the illustrative embodiment of the invention, the adjusting structure 106 is accomplished by each support comprising two portions, with one of the portions including a sleeve with a threaded interior and the other of the portions having a threaded exterior mated with the sleeve such that rotation of one portion with respect to the other portion causes an extension or contraction of the length of the support. Since the lengths of the supports 90, 92 are adjustable, the assembly 10 may be adjusted for different boat sizes and configurations, while also permitting adjustment of the height of the outboard end 64 of the main trailing member 60 to thereby adjust the height of the hitch mount 74 and a hitch ball mounted thereon.

Significantly, the pivotability of the main trailing member 60 about a substantially vertical axis, as well as being pivotable about a substantially horizontal axis, not only permits the height of the outboard end of the trailing member to be adjusted, but it also permits the trailing member to be swung to the side out of the way when the boat is to be loaded onto or launched from the trailer, or when the assembly is not needed but without having to remove the assembly from the trailer.

In greater detail, use of the invention generally includes mounting the mounting bracket assembly 12 on a transverse cross member 6 of the trailer 2, which may be accomplished by positioning a portion of the cross member 6 between the primary portion 16 and the first 38 and second 40 clamping members 40 of the secondary portion 18 of the mounting bracket assembly 12. The clamping members 38, 40 are attached to the primary portion 16 by the fasteners 42, 44 to clamp the mounting bracket assembly 12 onto the cross member 6. Significantly, the main trailing member 60 may be swung in a substantially horizontal plane to a position that is substantially parallel to the cross member 6 of the trailer 6, so that a boat (or other object) may be loaded onto the trailer without removing the main trailing member 60 or the mounting bracket assembly 12 from the trailer 2. Once the boat is loaded on the trailer 2, the main trailing member 60 may be swung into a position where it extends rearwardly from the trailer 2. When the boat is in place on the trailer 2 and it is desired to tow a trailer (not shown) behind the trailer 2, the supports 90, 92 may then be extended forwardly from the hitch mount 74 on the main trailing member 60 toward the rear transom of the boat, and the connecting structure 100 on the forward end 94 of each of the supports 90, 92 may be attached to the eyes 102, 104 that are typically located on the transom of the boat. If the supports 90, 92 are too long, or are too short, to reach the eyes 102, 104 on the boat when the main trailing member 60 is in the desired position, the length of the supports 90, 92 may be adjusted using the adjusting structure 106. The adjustment of the length of the supports 90, 92 may be used to set the height of the hitch mount 74 with respect to the ground below the trailer, so that the tongue of the second, trailing trailer is not too high or too low. The second trailer may be attached to the hitch mount 74 using a hitch ball mounted on a hole in the mounting plate 76, or using a hitch ball and receiver hitch inserted into the receiver tube 86. The structures of the hitch ball and receiver hitch are well known to those skilled in the art. When it is desired to remove the boat from the trailer 2, the supports 90, 92 are disconnected from the eyes 102, 104 on the transom (or other structure) on the boat, and the main trailer member 60, along with the supports 90, 92 may then be swung laterally off to the side into a position substantially parallel to the cross member 6 of the trailer so that the boat may move off of the trailer unimpeded, and may be held in that position by suitable structure if desired.

In FIGS. 5 through 9, a second implementation 110 of the present invention is show that is highly suitable for use on trailers in which the transverse cross member 6 is located forwardly of the rear end of the trailer, toward the rear axle of the trailer, rather than being located at the rear end of the trailer. This particular cross member arrangement is sometimes found on trailers in which rollers are employed to support the boat on the trailer. In particular, and as in the first implementation of the invention discussed above, the mounting bracket assembly 12 in the second implementation 110 is mounted on the transverse cross member 6 of the trailer, but interposed between the mounting bracket assembly 12 and the main trailing member 60 is a secondary trailing member 112 that extends rearwardly from the mounting bracket assembly 12. The connection between the secondary trailing member 112 and the mounting bracket assembly 12 is not necessarily a pivotable connection, although pivoting about a substantially horizontally oriented axis may be permitted by employing a pair of substantially vertical ears mounted on the mounting bracket assembly 12 and a substantially horizontally oriented pin extending through the ears and a forward end 113 of the secondary trailing member 112.

Additionally, the implementation 110 may also include a pair of transverse wing members 114, 116, that each extend laterally outwardly from the secondary trailing member 112 toward and adjacent to the first 4 and second 5 longitudinal frame members of the trailer. While the inward ends 118, 119 of the wing members 114, 116 are mounted on the secondary trailing member 112, the outward ends 120, 121 of the wing members 114, 116 are mounted on the first 4 and second 5 longitudinal frame members of the trailer. Such mounting of the outward ends 120, 121 may be accomplished, for example, by bolting or clamping to achieve a less permanent mounting, or by welding to provide a more permanent mounting. Preferably, the mounting of the wing members 114, 116 is made toward the rear ends of the longitudinal frame members 4, 5 and toward the rearward end 122 of the secondary trailing member 112.

The first pivot joint portion 50 is located on the rearward end 122 of the secondary trailing member 112, and the second pivot joint portion 66 on the main trailing member 60, so that the main trailing member 60 pivots with respect to the secondary trailing member 112.

Optionally, the invention may include a securing hook member 130 for hooking onto the main trailing member 60 when the main trailing member is positioned in a stowed or storage position in which the main trailing member 60 is oriented substantially parallel to the transverse cross member 6. The securing hook member 130 may be mounted on the transverse cross member 6 of the trailer 2 in the first implementation of the invention, or optionally, on one of the wing members 114, 116 (see FIG. 5). A loop member 132 may be mounted on the main trailing member 60 at a location that corresponds to the position of the securing hook member 130 when the main trailing member 60 is pivoted toward the transverse cross member 6. The loop member 132 may be hooked on and unhooked from the securing hook member 130 to secure and release the loop member 132, and the main trailing member 60, from the securing hook member 130. Optionally, other connecting means may be employed to hold the main trailing member 60 in the stowed position without departing from the spirit of the invention.

Although the stowed position of the main trailing member 60 provides a highly convenient manner of storing the invention when it is not being utilized, as an option the pin that extends between the spaced ears 52, 54 of the first pivot joint portion 50 may be removable to release the second pivot joint portion 66 and the pivot joint spider 72 from the ears 52, 54 of the mounting bracket assembly 12. This option may be suitable when the invention is not to be used for an extended period of time, and it should be realized that the pin extending between the spaced ears 68, 70 of the second pivot joint portion 66 may instead be removable.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An apparatus for pulling a trailer behind a boat trailer comprising:
   a mounting bracket assembly for mounting on the rear of the trailer;
   a main trailing member mounted on and being extended from the mounting bracket assembly, the main trailing member being mounted on the mounting bracket assembly in a manner such that the main trailing member is swingable about a substantially vertical axis for permitting movement of at least a portion of the main trailing member in a transverse direction with respect to a longitudinal axis of the trailer;
   at least one support for providing support to the main trailing member;
   wherein the at least one support is configured for being connectable to a boat carried on the trailer to provide support to the main trailing member from the boat.

2. The apparatus of claim 1 wherein the main trailing member is mounted on the mounting bracket assembly in a manner such that the main trailing member is pivotable about a substantially horizontal axis for permitting movement of at least a portion of the main trailing member in a substantially vertical direction.

3. The apparatus of claim 1 wherein the main trailing member has an inboard end mounted on the bracket member and an outboard end, a hitch mount being mounted on the outboard end.

4. The apparatus of claim 3 wherein the hitch mount comprises a mounting plate extending along an outboard portion of the main trailing member for mounting a hitch ball thereon.

5. The apparatus of claim 3 wherein the hitch mount comprises a receiver tube for receiving a hitch assembly of a receiver hitch.

6. An apparatus for pulling a trailer behind a boat trailer comprising:
   a mounting bracket assembly for mounting on the rear of the trailer;
   a main trailing member mounted on and being extended from the mounting bracket assembly, the main trailing member being mounted on the mounting bracket assembly in a manner such that the main trailing member is swingable about a substantially vertical axis for permitting movement of at least a portion of the main trailing member in a transverse direction with respect to a longitudinal axis of the trailer;
   at least one support for providing support to the main trailing member;
   wherein the at least one support has a forward end and a rearward end, the rearward end of the at least one support being pivotally mounted on the main trailing member.

7. The apparatus of claim 1 wherein the at least one support has a forward end and a rearward end, the forward end of the at least one support including connecting means for mounting to the boat on the trailer.

8. The apparatus of claim 7 wherein the connecting means on the at least one support is removably connectable to an eye on the boat.

9. An apparatus for pulling a trailer behind a boat trailer comprising:
 a mounting bracket assembly for mounting on the rear of the trailer;
 a main trailing member mounted on and being extended from the mounting bracket assembly, the main trailing member being mounted on the mounting bracket assembly in a manner such that the main trailing member is swingable about a substantially vertical axis for permitting movement of at least a portion of the main trailing member in a transverse direction with respect to a longitudinal axis of the trailer;
 at least one support for providing support to the main trailing member;
 wherein the at least one support includes adjusting means for adjusting a length of the at least one support.

10. The apparatus of claim 1 wherein the at least one support is one of a pair of supports located on opposite lateral sides of the main trailing member.

11. The apparatus of claim 10 wherein the pair of supports converge toward the outboard end of the main trailing member and diverge toward the inboard end of the main trailing member when the supports are connected to a boat positioned on the trailer.

12. The apparatus of claim 10 additionally comprising a pair of support mounts located toward the outboard end of the main trailing member, the pair of support mounts being located on opposite lateral sides of the main trailing member, each of the supports being mounted to one of the support mounts.

13. The apparatus of claim 1 wherein the trailer includes a transverse cross member, and wherein the mounting bracket assembly is mountable on the transverse cross member of the trailer.

14. The apparatus of claim 1 wherein the trailer includes a transverse cross member, and wherein the mounting bracket assembly is configured to clamp onto a portion of the transverse cross member of the trailer.

15. The apparatus of claim 1 additionally comprising a secondary trailing member positioned between the mounting bracket assembly and the main trailing member, the main trailing member being mounted on the secondary trailing member in a manner such that the main trailing member is swingable about a substantially vertical axis with respect to the secondary trailing member and the mounting bracket assembly.

16. The apparatus of claim 15 additionally comprising a pair of wing members extending laterally outward from the secondary trailing member.

17. The apparatus of claim 1 wherein the main trailing member is pivotable between a use position in which the main trailing member is adapted to extend substantially perpendicular to a transverse cross member of the trailer and a non-use position in which the main trailing member is adapted to extend substantially parallel to the transverse cross member of the trailer.

18. The apparatus of claim 1 wherein the main trailing member is removably mounted on the mounting bracket assembly for permitting removal of the main trailing member from the mounting bracket assembly without removing the mounting bracket assembly from the trailer when the mounting bracket assembly is mounted on the trailer.

19. In combination:
 a trailer configured to support a boat, the trailer having a longitudinal axis, the trailer having a front for orienting toward a vehicle when the vehicle is positioned for towing the trailer, the trailer having a rear opposite of the front of the trailer, the trailer including an axle extending transversely of the trailer and a cross member extending transversely of the trailer; and
 an apparatus for pulling a trailer behind the trailer comprising:
 a mounting bracket assembly removably mounted on the cross member of the trailer;
 a main trailing member extending rearwardly from the trailer, the main trailing member being mounted on and being extended from the mounting bracket assembly, the main trailing member being mounted on the mounting bracket assembly in a manner such that the main trailing member is swingable about a substantially vertical axis for permitting movement of at least a portion of the main trailing member in a transverse direction with respect to the longitudinal axis of the trailer;
 wherein the main trailing member has an inboard end mounted on the bracket member and an outboard end, a hitch mount being mounted on the outboard end.

20. The apparatus of claim 19 wherein the main trailing member is mounted on the mounting bracket assembly in a manner such that the main trailing member is pivotable about a substantially horizontal axis for permitting movement of at least a portion of the main trailing member in a substantially vertical direction.

21. The apparatus of claim 19 additionally comprising at least one support for providing support to the main trailing member, the at least one support being free of any direct connection to the trailer.

22. The apparatus of claim 21 wherein the at least one support is configured to be connectable to a boat carried on the trailer to provide support to the main trailing member from the boat.

* * * * *